US009384013B2

(12) United States Patent
Smith et al.

(10) Patent No.: US 9,384,013 B2
(45) Date of Patent: Jul. 5, 2016

(54) LAUNCH SURFACE CONTROL

(71) Applicant: MICROSOFT TECHNOLOGY LICENSING, LLC, Redmond, WA (US)

(72) Inventors: Robert Smith, Seattle, WA (US); Matt Bielich, Seattle, WA (US); Jonathan Garcia, Duval, WA (US); Joseph Wyman, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 10 days.

(21) Appl. No.: 13/907,969

(22) Filed: Jun. 3, 2013

(65) Prior Publication Data

US 2014/0359529 A1    Dec. 4, 2014

(51) Int. Cl.
*G06F 9/44* (2006.01)
*H04N 21/45* (2011.01)

(52) U.S. Cl.
CPC .......... *G06F 9/4443* (2013.01); *H04N 21/4532* (2013.01)

(58) Field of Classification Search
CPC .............. G06Q 10/101; G06Q 10/103; H04N 21/4532; G06F 3/0484
USPC ......................................................... 715/835
See application file for complete search history.

(56) References Cited

U.S. PATENT DOCUMENTS

| | | | |
|---|---|---|---|
| 6,934,697 | B1 | 8/2005 | Warren |
| 6,993,659 | B2 | 1/2006 | Milgramm et al. |
| 7,263,663 | B2 | 8/2007 | Ballard et al. |

(Continued)

FOREIGN PATENT DOCUMENTS

| | | |
|---|---|---|
| WO | 2009012330 A2 | 1/2009 |
| WO | 2013048421 A1 | 4/2013 |

(Continued)

OTHER PUBLICATIONS

Bohon, Cory, "How to Utilize Fast User Switching on Your Mac", Published on: Dec. 21, 2010, Available At: http://web.archive.org/web/20130902064651/http://www.maclife.com/article/howtos/how_utilize_fast_user_switching_your_mac.

(Continued)

*Primary Examiner* — Alvin Tan
(74) *Attorney, Agent, or Firm* — Aaron Chatterjee; Judy Yee; Micky Minhas

(57) ABSTRACT

Example apparatus and methods concern controlling context associations while maintaining a user experience. A memory stores information concerning a context associated with a shared launch surface in a multi-user system running on an apparatus. The memory also stores information concerning a second context associated with an application launched from the shared launch surface and running on the apparatus. Example apparatus and methods provide a launch surface context interface and an application context interface. The interfaces present information that facilitates changing launch surface ownership or application context while maintaining a user experience. For example, logic may selectively control a launch surface context association as a function of data provided by the launch surface context interface and may control an application context association as a function of data provided by the application context interface. The context associations can be manipulated without having to navigate to the launch surface.

13 Claims, 10 Drawing Sheets

(56) References Cited

U.S. PATENT DOCUMENTS

| | | | |
|---|---|---|---|
| 7,882,440 | B2 | 2/2011 | Mohr |
| 7,941,761 | B2 | 5/2011 | Hally et al. |
| 8,015,506 | B2 | 9/2011 | Fleishman et al. |
| 8,275,995 | B2 | 9/2012 | Jobmann |
| 8,386,757 | B1 | 2/2013 | Midgley et al. |
| 8,683,557 | B1 * | 3/2014 | Desikan ............... G06F 21/45 709/204 |
| 9,129,478 | B2 | 9/2015 | Smith et al. |
| 2002/0070978 | A1 | 6/2002 | Wishoff et al. |
| 2008/0032787 | A1 | 2/2008 | Low et al. |
| 2009/0089055 | A1 | 4/2009 | Caspi et al. |
| 2009/0138805 | A1 | 5/2009 | Hildreth |
| 2009/0215533 | A1 | 8/2009 | Zalewski et al. |
| 2010/0007582 | A1 | 1/2010 | Zalewski |
| 2010/0075749 | A1 | 3/2010 | Seshadri |
| 2010/0194762 | A1 | 8/2010 | Latta et al. |
| 2010/0285879 | A1 * | 11/2010 | Huang et al. .............. 463/36 |
| 2011/0112971 | A1 * | 5/2011 | Wynn et al. .............. 705/301 |
| 2011/0279368 | A1 | 11/2011 | Klein et al. |
| 2012/0166966 | A1 * | 6/2012 | Wood et al. .............. 715/750 |
| 2013/0091205 | A1 * | 4/2013 | Kotler et al. .............. 709/204 |
| 2013/0113878 | A1 | 5/2013 | Zalewski |
| 2013/0324244 | A1 | 12/2013 | Mikhailov et al. |

FOREIGN PATENT DOCUMENTS

| | | | |
|---|---|---|---|
| WO | 2013048426 | A1 | 4/2013 |
| WO | 2013182914 | A2 | 12/2013 |

OTHER PUBLICATIONS

"International Search Report and Written Opinion Issued in PCT Patent Application No. PCT/US2014/040100", Mailed Date: Feb. 6, 2015, 12 Pages.

"Microsoft and Citrix: Joint Virtual Desktop Infrastructure (VDI) Offering", Retrieved at <<http://www.citrix.com/%2Fsite%2Fresourcee%2Fdynamic%2Fsalesdocs%2FMicrosoft_Citrix_VDI_Architectural_Guidance_08-13.pdf>>, Jul. 2009, pp. 15.

"Attributing User Action Based on Biometric Identity", U.S. Appl. No. 13/897,466, filed May 20, 2013, pp. 36.

"Written Opinion Received for PCT Application No. PCT/US2014/040100", Mailed Date: Jun. 12, 2015. 7 Pages.

"International Preliminary Report on Patentability Issued in PCT Application No. PCT/US2014/040100", Mailed Date: Sep. 16, 2015, 8 Pages.

Pedraza, et al., "Privacy and Legal Requirements for Developing Biometric Identification Software in Context-Based Applications", Retrieved at <<http://www.sersc.org/journals/IJBSBT/vol2.sub.--no1/2.pdf>> International Journal of Bio-Science and Bio-Technology, vol. 1, No. 2, Mar. 2010, pp. 13-24 (12 pages total).

Jain, et al., "Biometric Identification", Retrieved at <<http://www.andrew.cmu.edu/course/67-302/BionnetricsACM.pdf>>, in Commmunication of ACM, vol. 43, No. 2, Feb. 2000, pp. 91-98 (8 pages total).

"Etronika NUI Banking", Retrieved at <<http://www.etronika.lt/kinect.sub.--project/ETRONIKA.sub.--NUI.su- b.--Banking.pdf, Retrieved Date: Mar. 26, 2013 (6 pages total).

Saddik, et al., "A Novel Biometric System for Identification and Verification of Haptic Users", Retrieved at <<http://ieeexplore.ieee.org/stamp/stamp.jsp?tp=&arnumber=4200995&g- t;>>, IEEE Transaction on Instrumentation and Measurement, vol. 56, Issue.3, Jun. 2007, pp. 895-906 (12 pages total).

Leyvand, et al., "Kinect Identity: Technology and Experience", Retrieved at <<http://research.microsoft.com/en-us/um/people/jiansun/papers/i- eeecomputer11.sub.--kinectidentity.pdf, In IEEE Computer Society, vol. 44, Issue.4, Apr. 2011, (4 pages total).

Constantino, Fabio "Best Effort Identification", Retrieved at https://fenix.ist.utl.pt/downloadFile/395144694736, Retrieved Date: Apr. 1, 2013 (9 pages total).

Musa, et al., "A Simple Model for Biometric Identification Technology Using Fingerprint Scanning", Retrieved at <<http://ieeexplore.ieee.org/stamp/stamp.jsp?tp=&arnumber=6197071&g- t;>, In Proceeding of IEEE SoutheastCon, Mar. 15, 2012 (4 pages total).

\* cited by examiner

LAUNCH SURFACE CONTROL

BACKGROUND

Conventionally, game systems and other multi-user systems have had system level actions (e.g., application launching) associated with a current owner of a launch surface. A launch surface may be, for example, a start menu, a desktop, or other interface from which applications can be launched or other system level actions can be taken. Conventionally, one user has been identified as controlling the console or owning the launch surface. This control was manifested at the system level by having application launches associated with the user who controlled the launch surface. For example, when an application was launched, the application's behavior, appearance, billing, or other impacts may have been a function of the owner of the launch surface.

Computer systems, including game systems, may allow multiple users to access, sign in, or otherwise interact with the system at the same time. For example, a single game console may support multiple local players and multiple remote players. Additionally, the game console may allow different players to have different games or applications active at different times and even to come and go from a game or application. A traditional, fixed, one-to-one relationship between the owner of the launch surface and that owner's context being associated with applications launched from the console may have limited the game experience. This limiting experience may extend to other non-gaming systems. For example, other multi-user systems may have had similar launch-surface owner based context association control.

Different users may have different contexts. A user context may describe, for example, user attributes and user state. User attributes may include, for example, name, language preferences, or other data. User state may include, for example, location, billing balances, game experience level, saved games, or other data. When there are multiple users signed into a system there are multiple contexts available to the system. Conventionally, when a user launched an application, the context associated with the launch surface was automatically associated with the application and thus controlled, at least in part, the operation of the application. For example, a first user context may have caused an application to produce an English language presentation for a male who is an intermediate level swordsman and who has a limited data plan while a second user context may have caused an application to produce a French language presentation for a female who is an expert archer and who has an unlimited data plan. The context may have controlled in-game attributes (e.g., point of view, character) but may also have controlled attributes of other applications launched from the launch surface. Conventionally, the one-to-one fixed relationship between a user context and the launch surface ownership may have made it difficult, if even possible at all, to change launch surface ownership or to change application contexts.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods display graphical user interface elements, present non-graphical user interface elements, or interact with physical user interface elements. The user interface (UI) elements facilitate changing launch surface ownership by changing a context associated with the launch surface. The UI elements may also facilitate changing application context associations by changing a context associated with an application. The context may control, for example, adult/unrestricted access versus child/restricted access, a guest access versus authenticated user access, an administrator versus normal user access, or other context-controlled items. The UI elements may present information (e.g., image, avatar) that identifies a current owner of a launch surface and a potential owner(s) of the launch surface. Users may then switch owners using the UI element while maintaining their user experience (e.g., game in progress, music video in progress, application in use) with the system. The UI elements may also present information that identifies a current context and other potential contexts. Users may then switch the context of a running application using the UI element while maintaining their experience (e.g., social media application in progress) with the system.

Example apparatus (e.g., game console) may be configured with hardware (e.g., circuits) for interacting with other related apparatus (e.g., game controller). The example apparatus may include a memory configured to store information concerning ownership of a shared launch surface provided by the apparatus or an operating system running on the apparatus. The memory may also store information concerning a user whose context is associated with an application that was launched from the launch surface. Example apparatus may identify a user of an apparatus (e.g., controller) operably connected to and communicating with the multi-user system. The apparatus may be configured with a physical launch surface user interface element (e.g., button). Upon detecting an interaction with the launch surface user interface element, example apparatus may selectively change ownership of the launch surface to the user of the apparatus without navigating to the launch surface.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
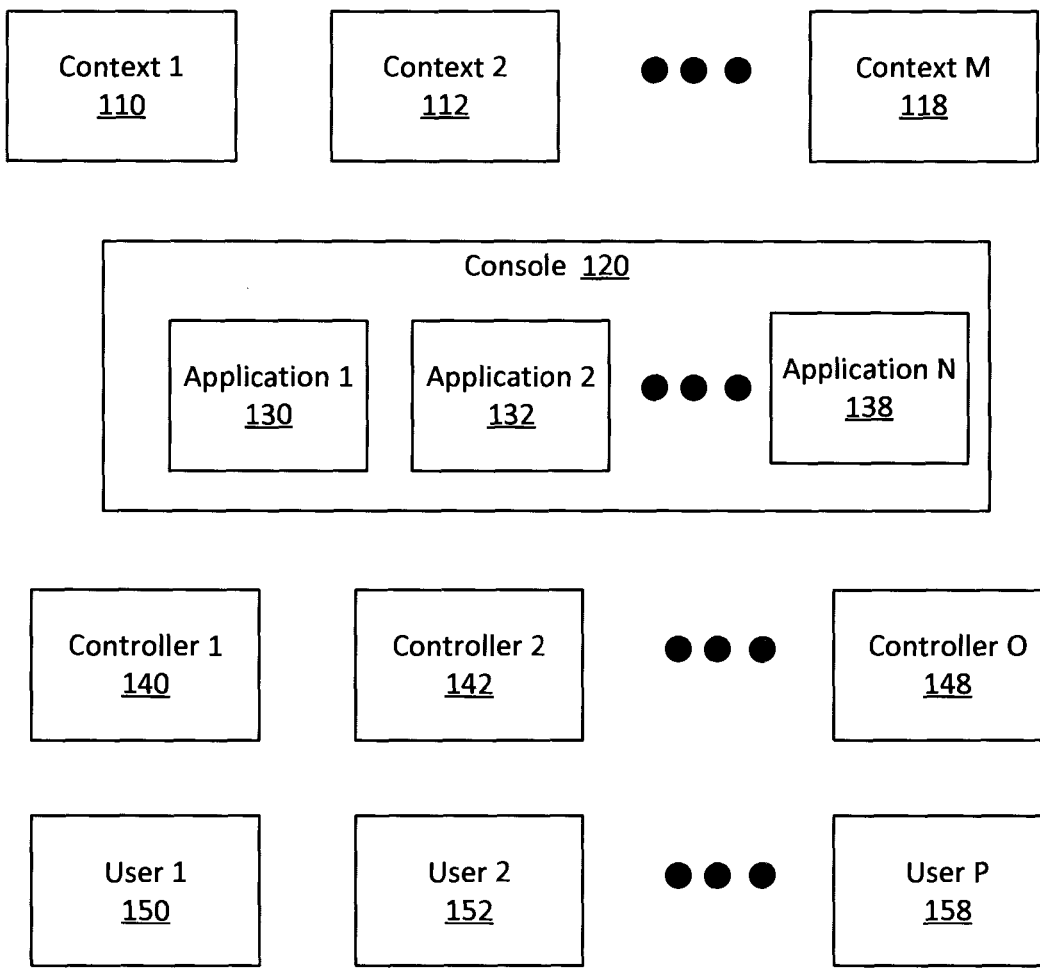
FIG. 1 illustrates an example game environment.

Example apparatus and methods improve the user experience associated with acquiring ownership of a launch surface or changing a user context associated with an application. Example apparatus and methods recognize that a multi-user system may have multiple users that may want to launch or otherwise interact with applications. Example apparatus and methods also recognize that users may have contexts that they want associated with an application or application action. Thus, rather than tightly and fixedly coupling a launch surface to a single user and to a single context, example apparatus and methods facilitate changing launch surface ownership or changing application context.

Some computer systems are intended to be used by multiple users. For example, a game system with a football game may allow two users to play video football against each other. Some role playing games or combat games may allow teams of players to work together against a common opponent. Game systems may now allow users to do more than just play games. For example, a game console can be used to watch videos, to watch television episodes, to browse the internet, to check stock prices, or for other uses. Conventionally, a game console may have allowed one program to run at one time. A user could either play a game or use another application. However, game consoles may now allow users to run multiple applications at once, perhaps each in its own window. Thus a gamer may be able to check their stock prices while playing a game without having to stop the game. While a "game console" is described, different devices (e.g., computer, tablet, smart phone) may function as a game console that allows multiple players to play a game. Since multiple users are allowed, consider the scenarios described below.

Joe is at Jane's house playing a game on the game console. Jane owns the game console and they are playing a game she launched in her context. Her context includes her preferences (e.g., language, colors, graphics quality), her account information (e.g., name, billing method, balance, rate), her state (e.g., current position in game, current level in game, game experience) or other information. While they are playing, Joe receives a text message that the latest song by his favorite artist was just released. Joe wants to listen to the song or watch the video, but neither Jane nor Joe wants to stop the game. Conventionally they had to choose to either listen to the song or continue playing the game. Conventionally, if Joe wanted to download or view, Jane and Joe had to stop the game so that Joe could manually take control of the launch surface. After stopping the game, taking control of the launch surface would include navigating to a system level user interface associated with the launch surface. Once he had control of the launch surface, Joe's context would be associated with the launch surface and Joe could launch an application to listen to or watch the video. Once he was done, Jane would have to navigate to the system level user interface to reacquire the launch surface and to re-associate her context with the launch surface. Finally Jane could re-start the game. This approach is more burdensome than gamers prefer.

On personal computers, laptops, tablets and other devices it may be possible to switch the context associated with the launch surface, but once again the steps to do so may be unnatural and obtrusive. In a smart phone environment, the situation may be even worse. It may be difficult, if even possible at all, to launch an application in Joe's context using Jane's phone.

Having considered the above scenario, now consider the more general situation where there is a system that has multiple users signed in that are able to interact with the system at the same time. The system may be the type of system that allows multiple applications to be run at the same time by multiple different users. In this situation, it may be difficult to determine in which context an application should be launched. For example, if user A and user B are both signed in, and if an application is launched, in which context should it be launched? As described above, conventional systems have either only had a single context (e.g., phone owner), have only allowed a single user to be signed in at a time, have associated a single user with a launch surface (e.g., desktop, start menu), or have had other restrictive approaches.

Example apparatus and methods provide a true multi-user system where launch surfaces are easily switchable, without requiring unnatural actions, to allow fluid use of applications that can be associated with different user contexts. Example apparatus and methods may address different scenarios.

A first scenario concerns switching the launch surface from one owner to another owner, from the launch surface, without interrupting the current experience. The launch surface can be switched from one user to another user so that applications can be launched from the different contexts associated with the different users. In this scenario, a user interface element presents information (e.g., photograph, name, avatar) that identifies the current owner of the launch surface. Applications launched or other actions taken from the launch surface will be associated with the context of the current owner of the launch surface. The UI may also present or identify other potential owners of the launch surface. In one embodiment, information about the current owner of the launch surface is presented and when a user interacts with the user interface element, the element may expand to show other potential owners. The user may select a different owner, causing the ownership of the launch surface to change. The selection may be made at the user interface element that was presented or using a different, separate user interface element or apparatus. For example, a first graphical user interface element may display choices and a second gesture based user interface element on a second apparatus may be used to make the selection. When the ownership of the launch surface changes, the new owner is presented in the launch surface ownership UI and applications launched or other actions taken from the launch surface will now be associated with the context of the new owner. Presenting the UI and having a user interact with the UI may occur without disrupting the current experience (e.g., game in progress, browsing in progress, video being watched).

A second scenario concerns switching the launch surface from within an application (e.g., game) without displaying the launch surface before it is changed. The launch surface can be changed to a display associated with the new owner before the launch surface is shown. This prevents seeing the old launch surface, which may be desired because the old launch surface may show, for example, information that a launch surface owner prefers to keep private.

In one embodiment, if a user is in an application outside the launch surface, the user may switch to their own launch surface by taking a launch surface action. Taking a launch surface action may include, for example, pressing a launch surface button on a controller, speaking a launch surface command, making a launch surface gesture, or other action.

In one embodiment, a launch surface button on a controller, or other user interface element, may be tied to a specific user. Pressing the launch surface button, or otherwise interacting with a launch surface interface element, allows the user to navigate to the launch surface associated with the button or interface element owner.

A third scenario concerns switching the context of the application from within an application without having to visit or change the launch surface. In this scenario, when an application is already running, the current user whose context is associated with the application may be displayed or otherwise presented in the application. For example, a user interface element may display or otherwise present information that identifies the user (e.g., picture, name, avatar). The user interface element may also display or otherwise present information that identifies other potential users. Actions taken in the application will be associated with the current context associated with the application. A user may interact with the user interface element causing the user interface element to display information that identifies the other potential users. The user may select one of the other potential users and the context associated with the application will be switched to that user's context. The switch is made without having to navigate back to the launch surface and without having to terminate the application. For example, a user may be running a social media program and may be sending and receiving text messages. The user may notice that there is an announcement that would be of interest to their friend. The user may navigate to the user interface element, display their friend's icon, switch the context to the friend's context, and let their friend interact with the social media media application. The users did not have to log off of one identity and log onto another identity. The users did not have to navigate back to the launch surface to change the context. The context switch was made from within the application using the context switching user interface element. In this example, the context associated with the application may be changed without changing the owner of the launch surface.

FIG. 1 illustrates an example game environment. A game console 120 may be able to run a number of applications (e.g., application1 130, application2 132, . . . applicationN 138). Console 120 may be able to support or interact with a number of controllers (e.g., controller1 140, controller2 142, . . . controllerO 148). Since console 120 is a multi-user system, console 120 may be able to support a number of users (e.g., user1 150, user2, 152, . . . userP 158). Since the console 120 may support multiple users, console 120 may have access to multiple contexts (e.g., context1 110, context2 112, . . . contextM 118).

Figure 9:
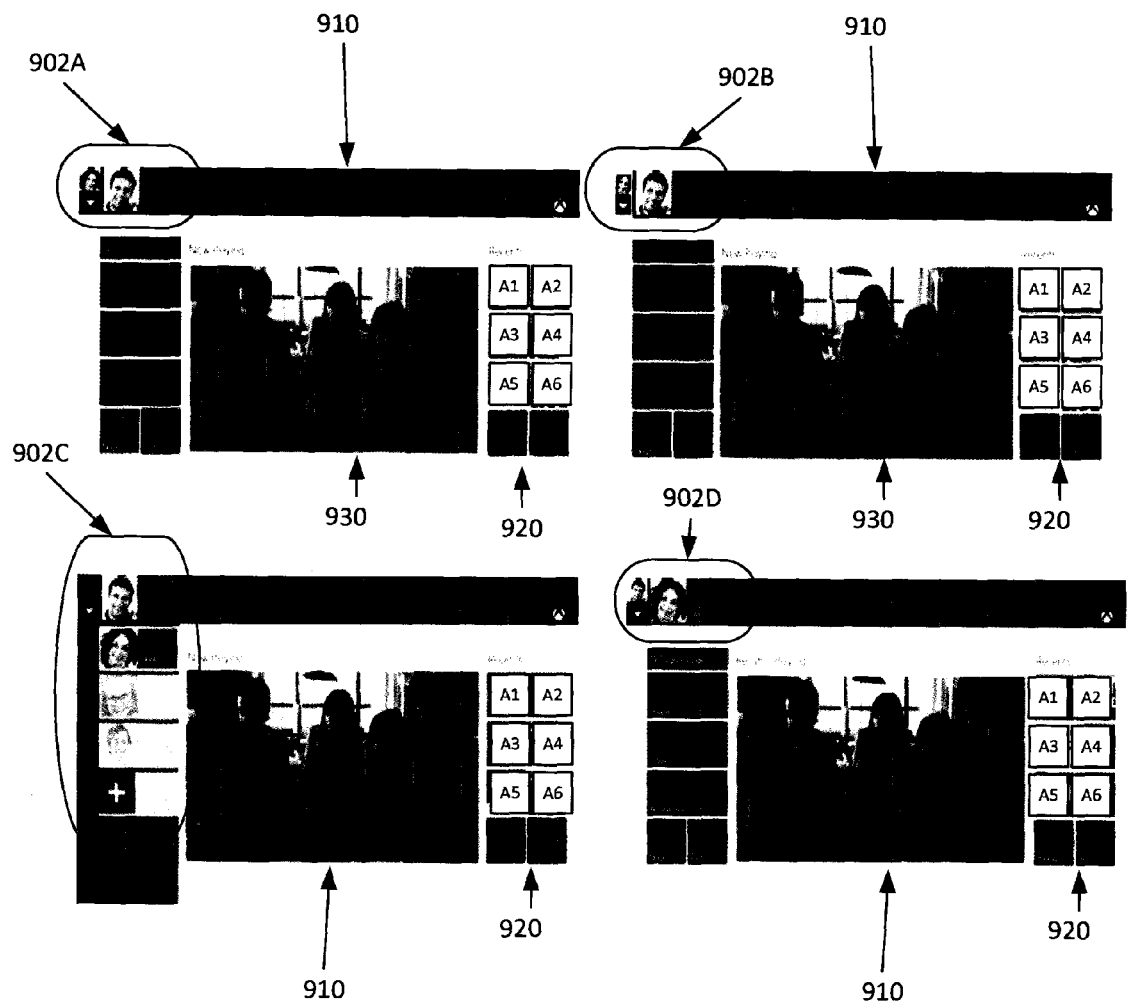
FIG. 9 illustrates example screen shots displayed by apparatus or methods that provide a user-controllable launch context.

FIG. 9 illustrates example screen shots associated with changing launch surface ownership from a launch surface. Screen 910 is illustrated at four different times. Screen 910 has a main area 930 and a side bar 920. Main area 930 may display a video while side bar 920 may display applications recently used by the owner of the launch surface. A user interface element depicted in ovals 902A, 902B, 902C, and 902D illustrates changing ownership without having to interrupt the experience in progress and without having to navigate away from a current application or launch surface.

At a first time, depicted in the upper left of FIG. 9, a user interface element in oval 902A displays two pictures. A larger picture in 902A shows the current owner of the launch surface. A smaller picture in 902A shows a potential owner of the launch surface. At a second time, depicted in the upper right of FIG. 9, the user interface element in oval 902B shows the smaller picture highlighted in response to a user navigating to the smaller picture. At a third time, depicted in the lower left of FIG. 9, the user interface element in oval 902C shows larger pictures of the current owner, the potential owner to which the user has navigated, and other potential owners. The potential owner to which the user has navigated is highlighted. The other potential owners who are not currently signed in are ghosted Out. If the user selects the highlighted potential owner, then launch surface ownership will be changed to the potential owner. At a fourth time, depicted in the lower right of FIG. 9, the user interface element in oval 902D shows that the ownership has been changed. The user experience (e.g., watching a video in area 930) was not disrupted. However, other indicia of the ownership change are present in sidebar 920, where applications recently launched by the new owner are illustrated instead of applications launched by the previous owner. While relative size and highlighting of images are presented in FIG. 9, other indicia of current ownership and potential ownership may be employed.

Figure 10:
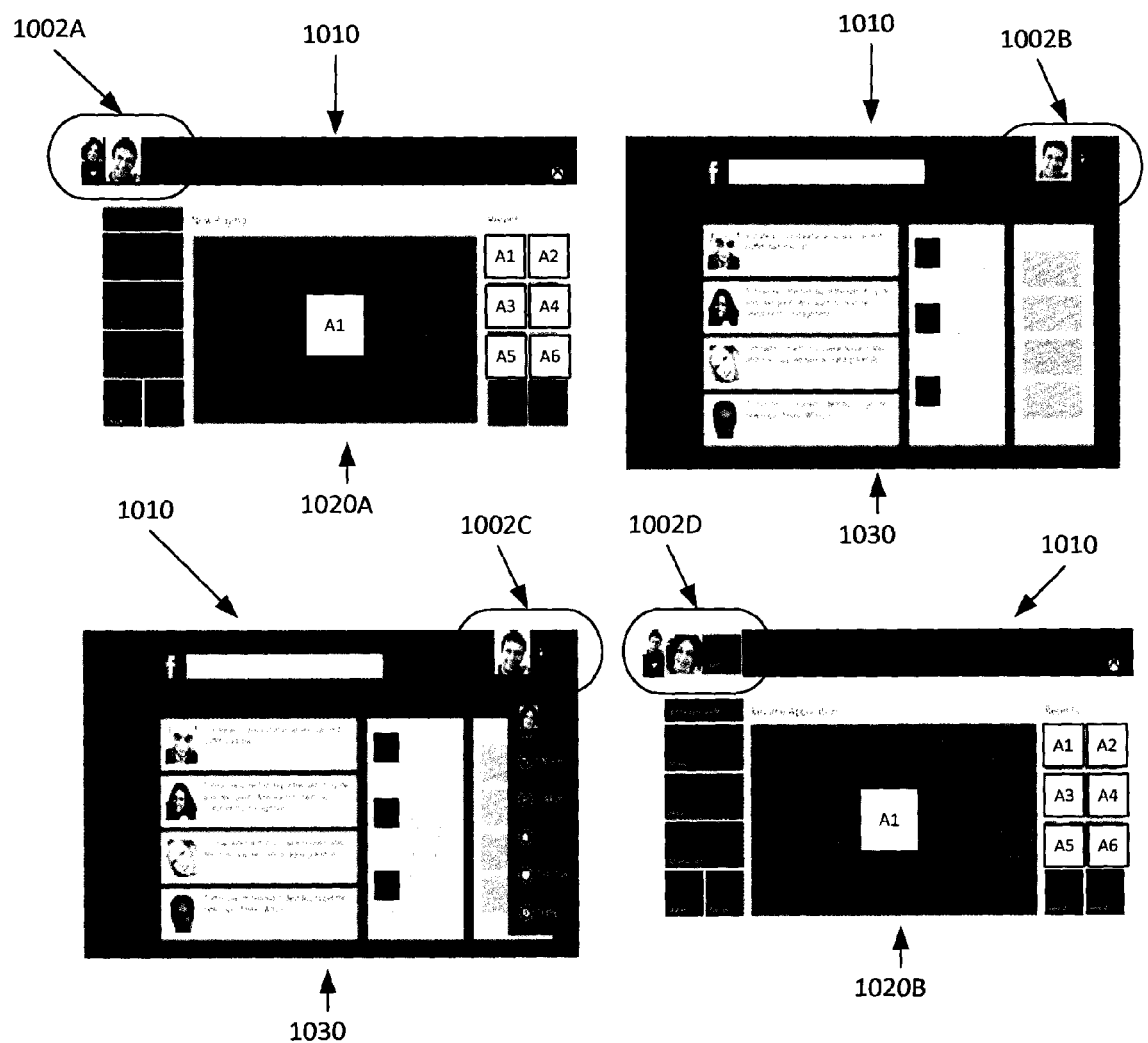
FIG. 10 illustrates example screen shots displayed by apparatus or methods that provide a user-controllable application context.

FIG. 10 illustrates example screen shots associated with changing launch surface ownership from a physical launch surface element. Screen 1010 is illustrated at four times. At a first time, depicted in the upper left of FIG. 10, an application start screen 1020A indicates that the application is ready to launch. At a second time, depicted in the upper right of FIG. 10, the application screen 1030 illustrates that the application has been launched. At the first time, a user interface element in oval 1002A identifies the current launch surface owner in a larger picture while a potential launch surface owner is presented in a smaller picture. While the relative size of pictures is used to represent current ownership and potential ownership, other methods of indicating ownership may also be employed. For example, current ownership may be highlighted while potential ownership is ghosted, current ownership may be high definition while potential ownership is low definition, current ownership may have a frame that is moving while potential ownership has a static frame, or current ownership may be presented in a first color while potential ownership is presented in a different color. Other indicators may be employed. At the second time, the user interface element in oval 1002B continues to identify the current owner.

At a third time, depicted in the lower left of FIG. 10, the user interface element in oval 1002C indicates that a control surface ownership change has been initiated by a launch surface interface element interaction. The launch surface interface element may be, for example, a physical button on a physical controller operably connected to the system. The controller may be, for example, a game controller and the system may be, for example, a game console. Example apparatus and methods may establish and maintain a mapping that identifies a user currently associated with a controller and thus, at a fourth time depicted in the lower right of FIG. 10, the user interface element in oval 1002D shows that launch surface ownership has been changed. The launch surface associated with the new owner is presented and a screen 1020B shows that an application is ready to launch.

Figure 5:
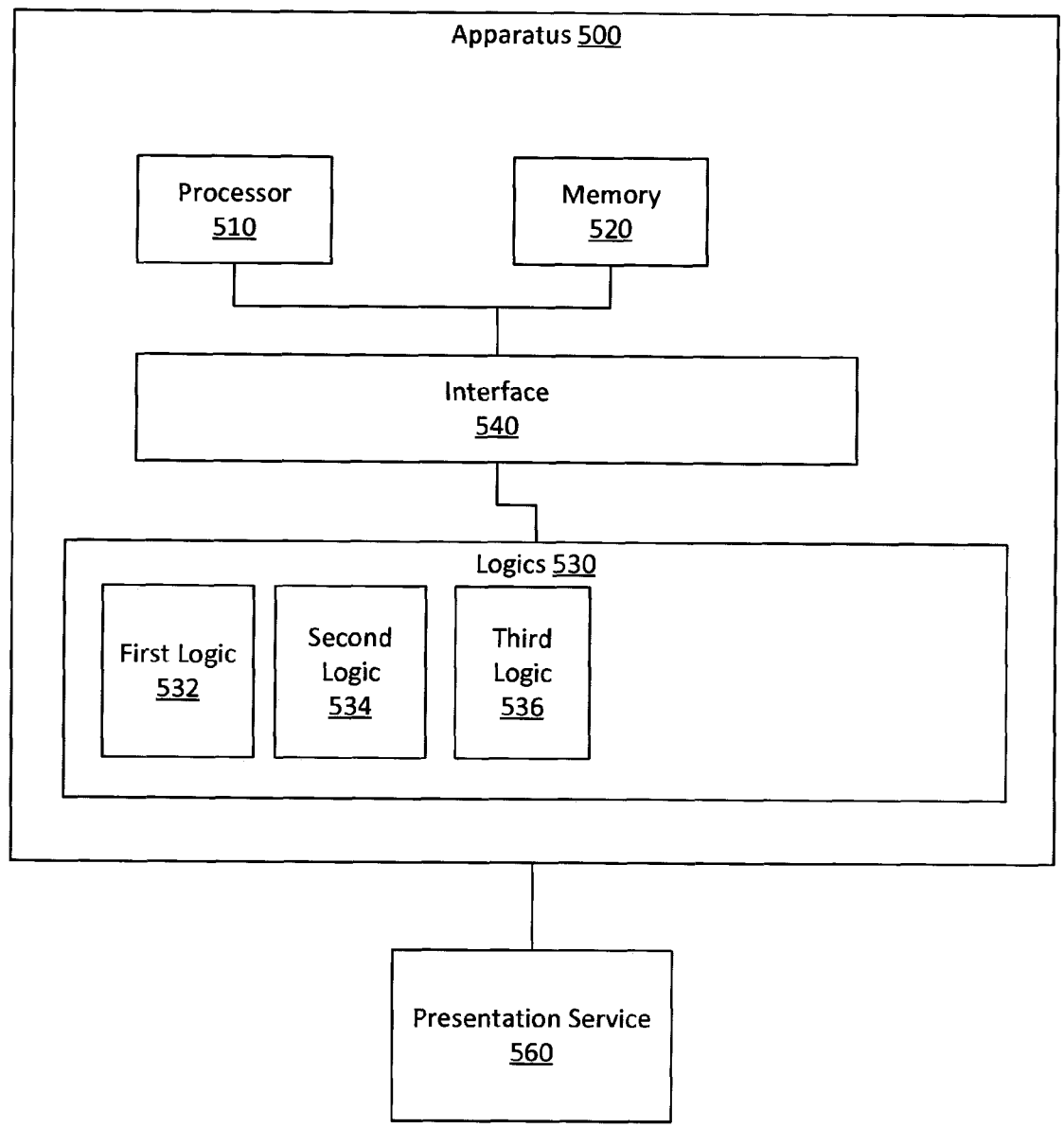
FIG. 5 illustrates an example apparatus configured to provide a user-controllable launch context.
Figure 6:
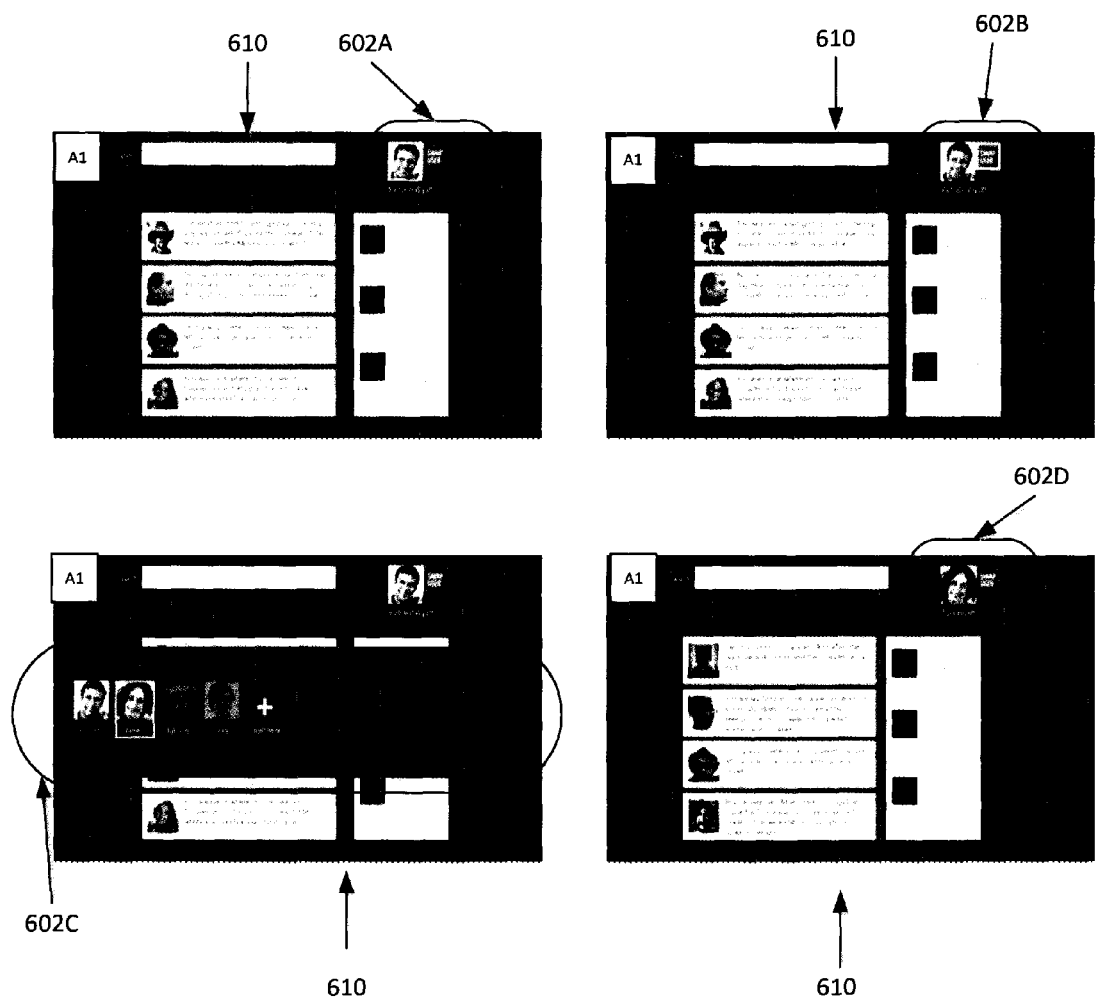
FIG. 6 illustrates example screen shots displayed by apparatus or methods that provide a user-controllable launch context.

FIG. 6 illustrates example screen shots associated with changing application context from within an application. FIG. 6 illustrates an application at four different points in time. At a first point, depicted in the upper left of FIG. 6, a screen 610 shows a social media application that is associated with the user identified in the user interface element in oval 602A. At a second point, depicted in the upper right of FIG. 6, the user interface element in oval 602B indicates that a user wants to change the context associated with the application. Rather than having to exit the application, navigate back to the launch surface, change ownership, and then re-launch the application, example apparatus and methods facilitate changing context from within the application. Thus, at a third time, depicted in the bottom left of FIG. 6, the user interface element in oval 602C shows the user whose context is currently associated with the application, a potential user whose context is about to be associated with the application, and other potential users who are not currently logged in and available to have their contexts associated with the application. At a fourth point, depicted in the bottom right of FIG. 6, the user interface element in oval 602D illustrates the new user whose context is now associated with the social media application. The messages displayed, friends available, and other social media attributes are now associated with the new user, not the old user. The social media experience was maintained because the users were able to switch context without even having to exit the application. FIGS. 2-5 and 7-8 describe example apparatus and methods that facilitate providing the functionality illustrated in FIGS. 6, 9, and 10.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 2:
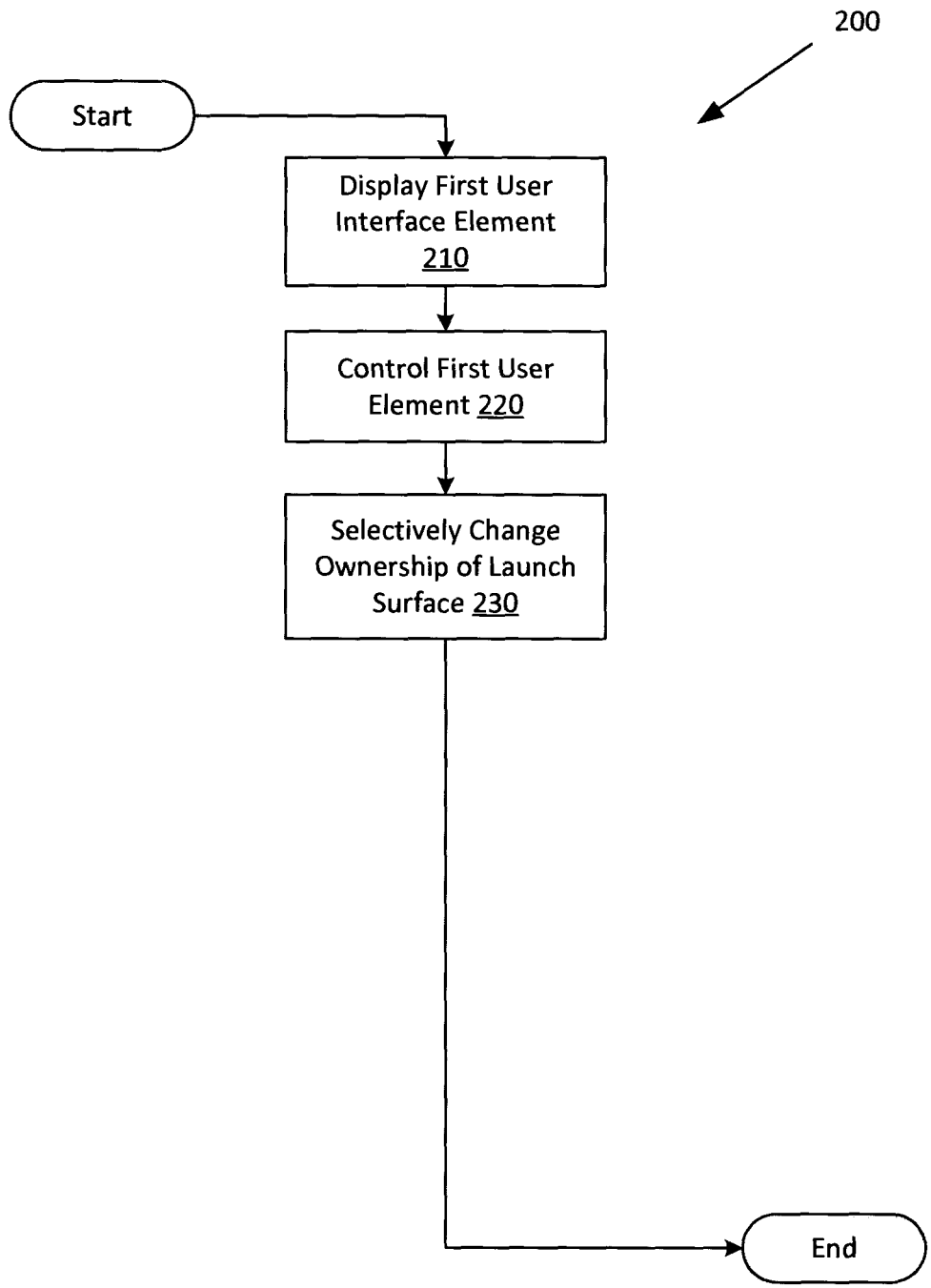
FIG. 2 illustrates an example method associated with launch surface control.

FIG. 2 illustrates an example method 200 associated with a user-controllable launch context and launch surface control. In different examples, method 200 may be performed on a single device, may be performed partially or completely in the cloud, may be performed on distributed co-operating devices, or may be performed other ways. In different examples, method 200 may be performed on devices including, but not limited to, a game console, a computer, a laptop computer, a tablet computer, a phone, and a smart phone.

Method 200 includes, at 210, displaying a first user interface element on a shareable launch surface associated with a multi-user system. The multi-user system may be, for example, a video game console. While a video game console is described, the multi-user system may also be, for example, a personal computer, a laptop computer, a tablet, a smart phone or other device. In one embodiment, devices like computers or phones may function as a game console. Thus, the shareable launch surface may be associated with a multi-user operating system running on a laptop computer, a tablet computer, a phone, or other hardware.

A multi-user system, by definition, may have multiple users. Users may have associated contexts. An active user of the multi-user system may have an active user context. The context may include an attribute and a state. The attribute may describe data that is relatively unchanging for a user. The attribute may be, for example, a user name, a screen name, a data plan identifier, a billing identifier, an account identifier, a parental control setting, a display preference, a social media data, or other data. Different contexts may include a greater or smaller number of attributes. The state may describe data that changes more frequently for a user. The state may be, for example, a location, a data plan balance, a billing balance, an account balance, an experience level, an access time, an engaged time, a location, a connectivity level, or other data. Different contexts may include a greater or smaller number of state variables.

In one example, the first user interface element may be visible from the launch surface. In another embodiment, the first user interface may be visible from a running application that was launched from the launch surface. In one embodiment, the first user interface element may be visible from the launch surface and from running applications launched from the launch surface.

Method 200 also includes, at 220, controlling the first user interface element to present first information concerning a current owner of the launch surface and a potential owner of the launch surface. In different examples, the first information may be presented using images, icons, avatars, names, or text. Different user interface elements (e.g., display boxes, radio boxes, dials, lists, tables) may be used to present the images, icons, or other presentations.

Ownership of the launch surface involves associating a user context with the launch surface. Changing ownership of the launch surface involves changing which user context is associated with the launch surface. The association of the user context with the launch surface controls the user context with which a subsequent launch action will be associated. The launch surface action may be, for example, launching an application. The user context with which an application will be launched may control the look and feel of the application, costs associated with the application, security associated with running an application, or other factors. Associating a user context with the launch surface may include manipulating variables, stored values, circuits, or other items that relate the context to the launch surface.

Method 200 also includes, at 230, upon detecting a first selection from the first user interface element, selectively changing ownership of the launch surface as a function of the first selection. In one embodiment, the first user interface element display of information about the first selection may be made using a different user interface element or apparatus. Selectively changing ownership of the launch surface may include identifying a new owner of the launch surface as a function of the first selection. Since information about potential owners is displayed by the first user interface element, the first selection may involve, for example, moving a selection indicator over presented information and taking an action to indicate the new owner. For example, a user may use a mouse to move a cursor over a picture of a user and then may click on the picture of the user. Other selection actions may be employed.

Selectively changing ownership of the launch surface may also include selecting and accessing a user context associated with the new owner. Once the user context associated with the new owner is available, the ownership change may be completed by associating the user context associated with the new owner with the shared launch surface. Associating the user context with the shared launch surface may involve updating a pointer in a launch surface data structure, updating an address in a launch surface data structure, copying data from a context to a memory associated with the launch surface, or other actions.

The launch surface ownership may be changed while maintaining a first user experience associated with the multi-user system. Maintaining the first user experience may include keeping an application active and displayed, keeping a utility active and displayed, continuing to display a video or play music that was in progress, or other actions.

Figure 3:
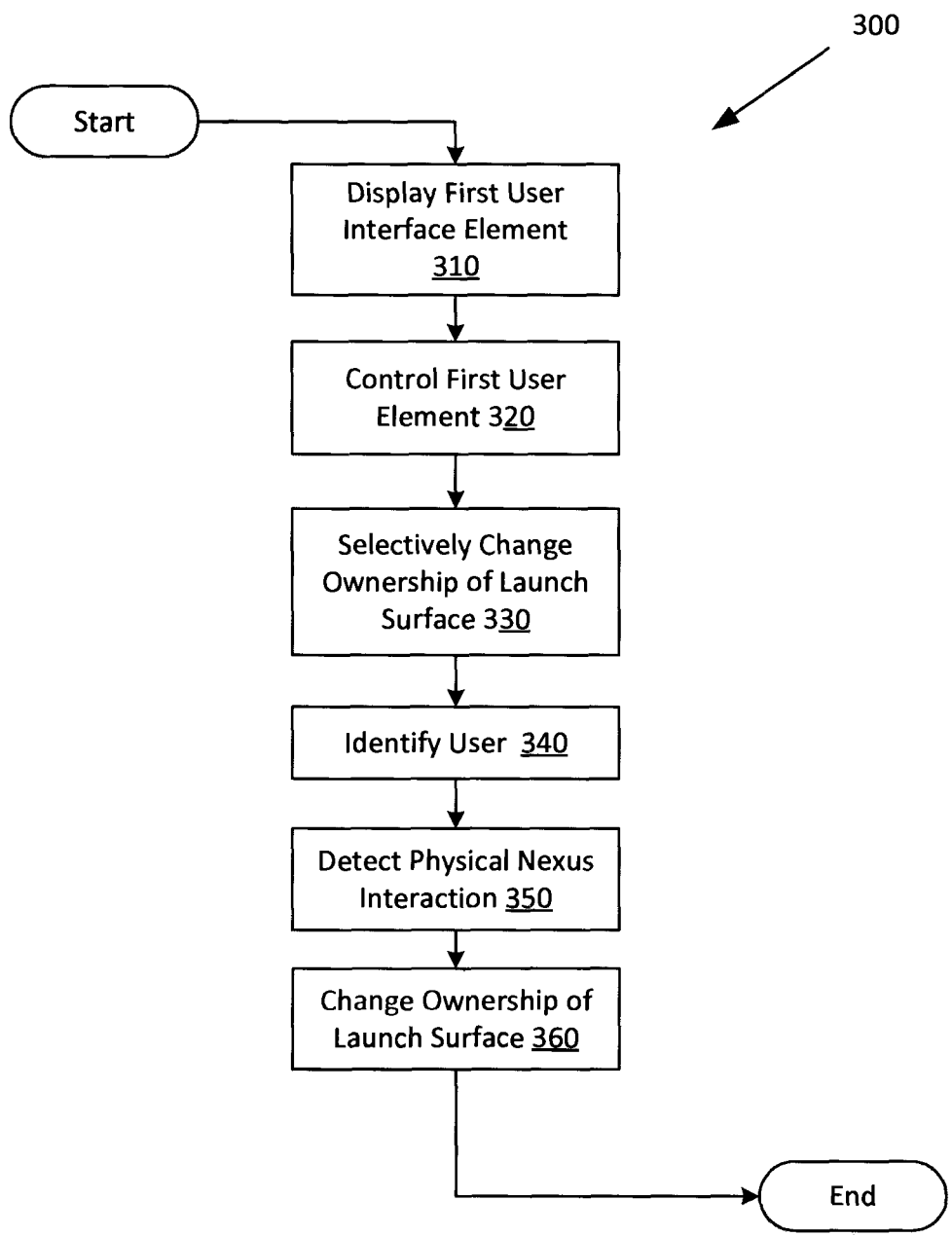
FIG. 3 illustrates an example method associated with launch surface control.

FIG. 3 illustrates an example method 300 associated with a user-controllable launch context. Like method 200, method 300 may be performed on a single device, may be performed partially or completely in the cloud, may be performed on distributed co-operating devices, or may be performed other ways. In different examples, method 300 may be performed on devices including, but not limited to, a game console, a computer, a laptop computer, a tablet computer, a phone, and a smart phone. The computer, laptop, tablet, or smart phone may function as a game console.

Method 300 includes some actions (e.g., 310, 320, 330) that correspond to actions in method 200. However, method 300 also includes additional actions. For example, method 300 includes, at 340, identifying a user of an apparatus operably connected to and communicating with the multi-user system. The identification may be retrieved, for example, from a mapping stored by the system. The mapping may identify a user that is currently using a particular controller. The apparatus may be, for example, a game controller attached to a game console. The apparatus may also be, for example, a phone being used to interact with a game or application, a tablet being used to interact with a game or application, or other device. In one embodiment, the apparatus is configured with a physical launch surface user interface element. The physical launch surface user interface element may be, for example, a button on a game controller and the interaction may be a press of the button. While a button is described, other tangible user interface elements may be employed. For example, the launch surface element may be a slider, a switch, a dial, a button, a touch pad, or other tangible piece of physical hardware.

Method 300 also includes, at 350, detecting an interaction with the physical launch surface user interface element. When the launch surface element is a button, the interaction may be a button press. When the launch surface element is a touch pad, the interaction may be a gesture on the touch pad. Different actions may be performed using different launch surface elements. Regardless of the form of the launch surface element, a user can make a selection that indicates that launch surface ownership is to be changed.

Thus, method 300 also includes, at 360, after detecting the interaction, selectively changing ownership of the launch surface to the user of the apparatus. The ownership is changed without navigating to the launch surface. Changing launch surface ownership without navigating to the launch surface facilitates maintaining a user experience. Maintaining the user experience may include, for example, keeping a user in a game, keeping a user in a word processor, keeping a user in a browsing session, or other actions. Conventionally, to change the launch surface ownership, the user may have had to exit their game, work, or browsing.

Figure 4:
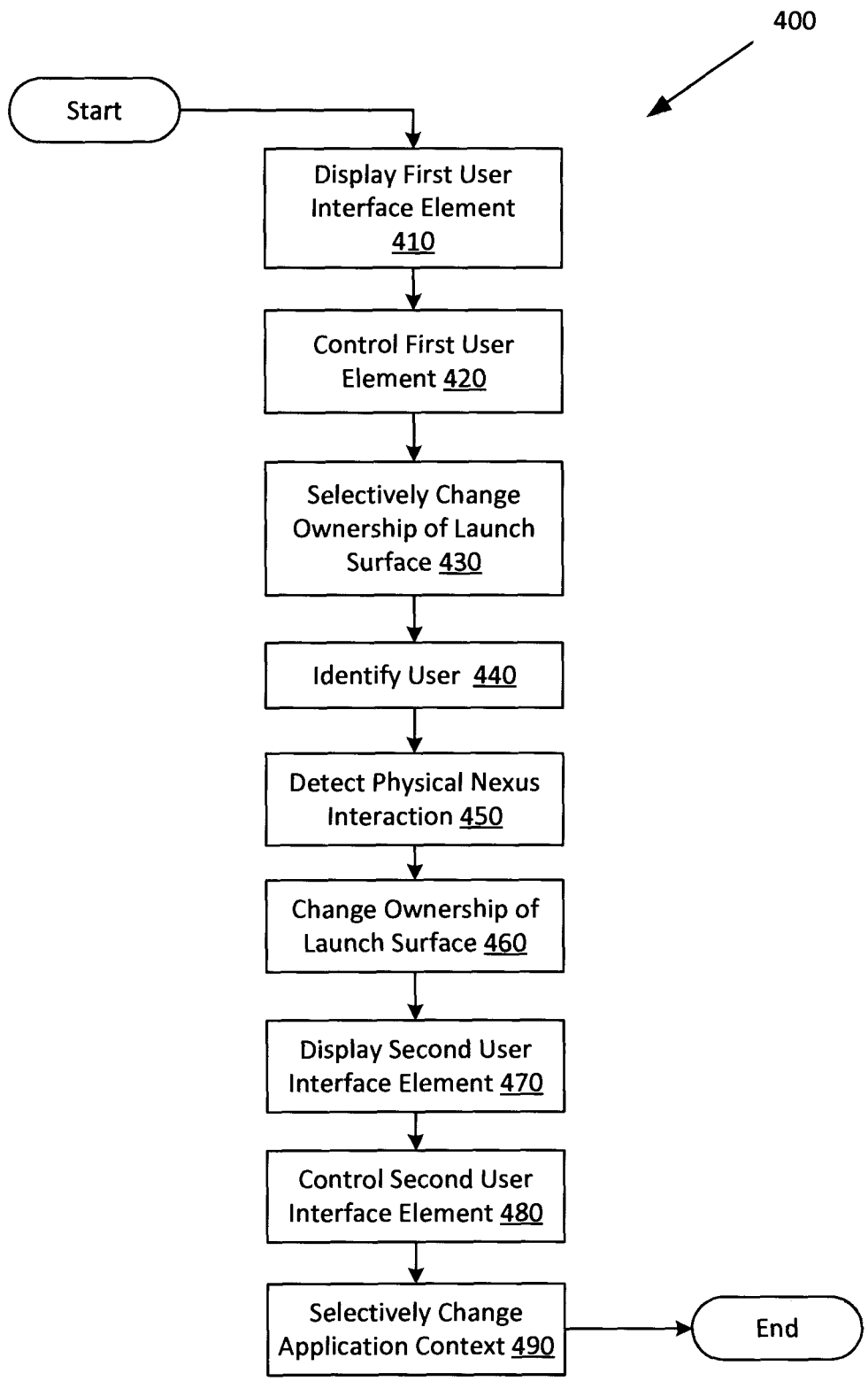
FIG. 4 illustrates an example method associated with launch surface control or application context control.

FIG. 4 illustrates an example method 400 associated with a user-controllable launch context. Like methods 200 and 300, method 400 may be performed on a single device, may be performed partially or completely in the cloud, may be performed on distributed co-operating devices, or may be performed other ways. In different examples, method 400 may be performed on devices including, but not limited to, a game console, a computer, a laptop computer, a tablet computer, a phone, and a smart phone.

Method 400 includes some actions (e.g., 410, 420, 430, 440, 450, 460) that correspond to actions in methods 200 and 300. However, method 400 also includes additional actions. For example, method 400 includes, at 470, displaying a second user interface element associated with a running application that was launched from the launch surface. In one example, method 400 may include configuring the second user interface element to be visible from the launch surface and from the running application.

When the application was launched from the launch surface, the application was associated with the context of the user who owned the launch surface at the time the application was launched. Conventionally, that owner would own the application from launch to exit. However, some users and some applications may prefer being able to change the context associated with an application without having to exit the application. For example, a video download application may be started by a first user. The first user may download a video with the data hit being charged against their data plan and with the dollar cost charged against their video account. A second user may also want to download a video. Rather than having to stop the application, navigate to the launch surface, change the launch surface ownership, and re-launch the application, example apparatus and methods facilitate having the second user change the context of the video download application using user interface elements visible on the launch surface or in the application. This maintains the "video download" experience without having to wade through system software or obtrusive context changes.

In one embodiment, the user experience may be nested or multi-level. For example, a first user may have launched a video game. The first user may be playing the video game with several friends, some in the same room, some remote. The first user may then have started a song download application to acquire some music to listen to while the game is still in progress. A second user may then want to download a song using the song download application and then check his stock prices. Conventionally, launching additional applications, and having different users take different actions would cause serious disruption to the gaming experience and even to the music download experience. Example apparatus and methods facilitate changing application contexts without stopping the music download program or the video game. Additionally, example apparatus and methods facilitate changing launch surface ownership so that a separate application (e.g., stock viewer and trader) will be associated with the appropriate user.

Method 400 may also include, at 480, controlling the second user interface element to present second information about users. The second information may include information about a current user whose context is associated with the running application and also about a potential user(s) whose context can be associated with the running application. In one embodiment, like the first user interface element presents the first information, the second user interface element may present the second information using images, icons, avatars, names, text, or other presentations.

Method 400 may also include, at 490, selectively changing the context of the running application upon detecting a second selection from the second user interface. In one embodiment, the second user interface element may present the information and a separate user interface element may be used to make the second selection. The context may be changed as a function of the second selection. The selection may be made, for example, by clicking on a picture, by speaking a name, by gesturing to an avatar, or in other ways. The context may be changed while maintaining a second user experience associated with the multi-user system. In one embodiment, maintaining the second user experience may include changing the context of the running application without navigating to the launch surface, changing the context of the running application without exiting the running application, and changing the context of the running application without changing ownership of the launch surface. Changing the context may include updating a system variable, changing the value of a pointer, changing an address in a context identification field, copying values from the context to a system memory, or other actions.

Methods 200, 300, and 400 present user interface elements. In one embodiment, these methods may include selectively displaying or hiding the first user interface element or the second user interface element in response to a user action detected by the multi-user system. The user action may be, for example, a voice command, a gesture, or other interaction with a graphical user interface. For example, a first voice command (e.g., "display switcher") may direct the system to display the launch surface UI while a second command (e.g., "hide switcher") may direct the system to hide the launch surface UI. Similarly, gestures may be used to display and hide the application context UI.

While FIGS. 2, 3, and 4 illustrate various actions occurring in serial, it is to be appreciated that various actions illustrated in FIGS. 2, 3, and 4 could occur substantially in parallel. By way of illustration, a first process could handle first user interface elements associated with launch surface ownership, a second process could handle second user interface elements associated with application context associations, and a third process could handle physical launch surface interface actions. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 200, 300, or 400. While executable instructions associated with the above methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals, per se. A computer-readable storage medium may take forms, including, but not limited to, non-volatile media, and volatile media. Non-volatile media may include, for example, optical disks, magnetic disks, tapes, flash memory, ROM, and other media. Volatile media may include, for example, semiconductor memories, dynamic memory (e.g., dynamic random access memory (DRAM), synchronous dynamic random access memory (SDRAM), double data rate synchronous dynamic random-access memory (DDR SDRAM), etc.), and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

FIG. 5 illustrates an apparatus 500 that includes a processor 510, a memory 520, a set 530 of logics, and an interface 540 that connects the processor 510, the memory 520, and the set 530 of logics. The memory 520 may store information concerning ownership of a shared launch surface. The memory 520 may also store information concerning a user context associated with an application launched from the launch surface. The memory 520 may store pointers or addresses to locate a user context, may store selected portions of a user context, may store an entire user context, or may store other information from which a user context can be identified or used. The memory 520 may store first information concerning a first user context associated with a shared launch surface associated with a multi-user system running on the apparatus. The memory 520 may also store second information concerning a second user context associated with an application launched from the shared launch surface and running on the apparatus.

The set 530 of logics may be configured to control context associations while maintaining a user experience. Apparatus 500 may be, for example, a game console, a device acting as a game console, a computer, a laptop computer, a tablet computer, a personal electronic device, a smart phone, system-on-a-chip (SoC), or other device that can access and process data. In one embodiment, the apparatus 500 may be a general purpose computer that has been transformed into a special purpose computer through the inclusion of the set 530 of logics. Apparatus 500 may interact with other apparatus, processes, and services through, for example, a computer network.

The set 530 of logics may include a first logic 532 that is configured to provide a launch surface context interface. In one embodiment, the first logic 532 may be configured to provide the launch surface context interface as a graphical user interface that presents first information concerning users whose contexts can be associated with the launch surface. In different embodiments, the graphical user interface element may be selectively visible from the launch surface and from the application. In different examples, the first information may be presented using images, icons, names, text, or avatars. In one embodiment, the first information may be presented using alternative approaches including, for example, audible presentation, haptic presentation, or other presentations.

In one embodiment, the first logic 532 may be configured to provide the launch surface context interface as a tangible user interface element on a controller. The tangible user interface element may be, for example, a button on a game controller. When other devices (e.g., tablet, phone) are used as a controller, the tangible user interface element may be, for example, a touch pad, a capacitive touch interface, or other element.

The set 530 of logics may also include a second logic 534 that is configured to provide an application context interface. In one embodiment, the second logic 534 may be configured to provide the application context interface as a graphical user interface element that presents second information concerning available users whose contexts can be associated with the application. The second information may be presented using, for example, images, icons, names, text, or avatars. In one embodiment, the second logic 534 may provide the second information using non-visual approaches including, for example, haptic presentations, audio presentations, or other presentations.

The set 530 of logics may also include a third logic 536 that is configured to selectively control a launch surface context association as a function of data provided by the launch surface context interface. The third logic 536 may also control an application context association as a function of data provided by the application context interface.

In one embodiment, the third logic 536 may be configured to control the launch surface context association by identifying a user who is taking over the launch surface. Identifying the user may include, for example, receiving selection information from a graphical user interface element, receiving a signal from a controller that is mapped to a particular user, or other action. Third logic 536 may also be configured to access a user context of the user who is taking over the launch surface. Accessing the user context may include, for example, copying data from a user context, establishing a pointer to a user context, establishing a remote procedure call interface with a context broker, or other action. Third logic 536 may also be configured to update the memory 520 with first data from the user context of the user who is taking over the launch surface. Data in memory 520 controls, at least in part, launch surface actions. For example, user context data in memory 520 may control the look and feel of an application that is subsequently launched, which application(s) can be launched, parental controls applied to the application, or other actions.

In one embodiment, the third logic 536 may be configured to control the application context association by identifying a user who is taking over the application context. The user may be identified in response to a selection made through a user interface element. Third logic 536 may also be configured to access a user context of the user who is taking over the application context. Accessing the user context may include, for example, copying data from a user context, establishing a pointer to a user context, establishing a remote procedure call interface with a context broker, or other action. Third logic 536 may also be configured to update the memory with second information from the user context of the user who is taking over the application context. Recall that data in the memory 520 controls, at least in part, actions performed by applications. For example, the context data in memory 520 may control an application display, application permissions, a user to be billed for actions taken by the application, or other items.

In different embodiments, some processing may be performed on the apparatus 500 and some processing may be performed by an external service or apparatus. Thus, in one embodiment, apparatus 500 may also include a communication circuit that is configured to communicate with an external source to facilitate accessing or processing action data, user data, or other data associated with attributing a user action. In one embodiment, the set 530 of logics may interact with a presentation service 560 to facilitate displaying data using different presentations for different devices.

The ownership may be controlled as a function of the action and the set of user specific data. For example, a first action may not require surface ownership to be changed while a second action may require surface ownership to change.

When surface ownership needs to be changed, the change may be from a current owner to a subsequent owner that is identified by the context. Additionally, attributes of the launch surface may depend on the context. For example, the set of operations that can be performed by the launch surface may be limited or expanded based on the context. In one embodiment, controlling ownership involves manipulating (e.g., reading, writing, updating) the information stored in the memory 520.

Figure 7:
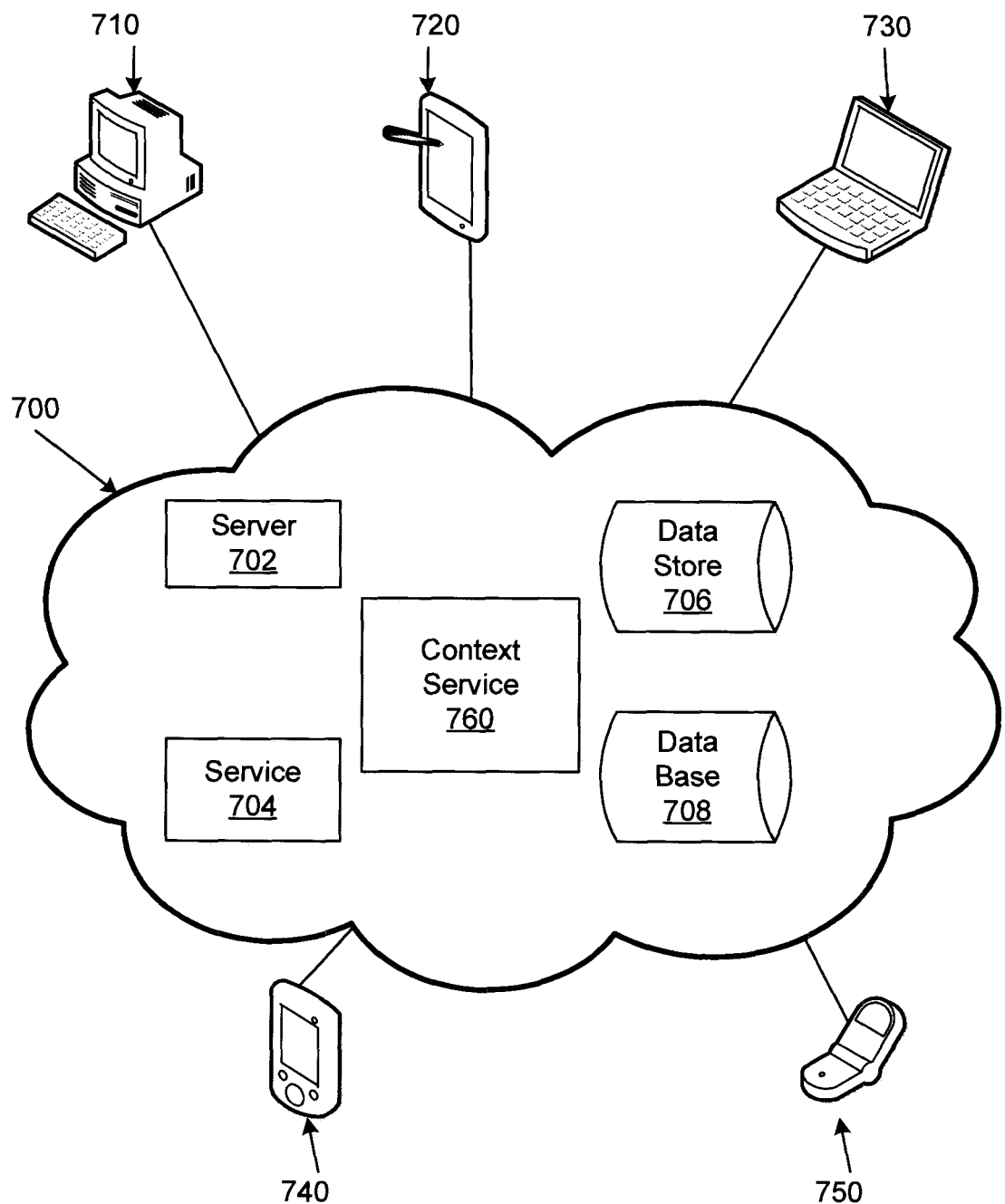
FIG. 7 illustrates an example cloud operating environment.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example context service 760 residing in the cloud. The context service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the context service 760.

FIG. 7 illustrates various devices accessing the context service 760 in the cloud. The devices include a computer 710, a tablet 720, a laptop computer 730, a personal digital assistant 740, and a mobile device (e.g., cellular phone, satellite phone, wearable computing device) 750. The context service 760 may store, access, or process action data, user data, mapping data, or other data associated with seamlessly changing launch surface ownership or application context.

It is possible that different users at different locations using different devices may access the context service 760 through different networks or interfaces. In one example, the context service 760 may be accessed by a mobile device 750. In another example, portions of context service 760 may reside on a mobile device 750. In one example, context service 760 may dynamically identify users and ownership actions. This may allow changing launch surface ownership without navigating to the launch surface.

Figure 8:
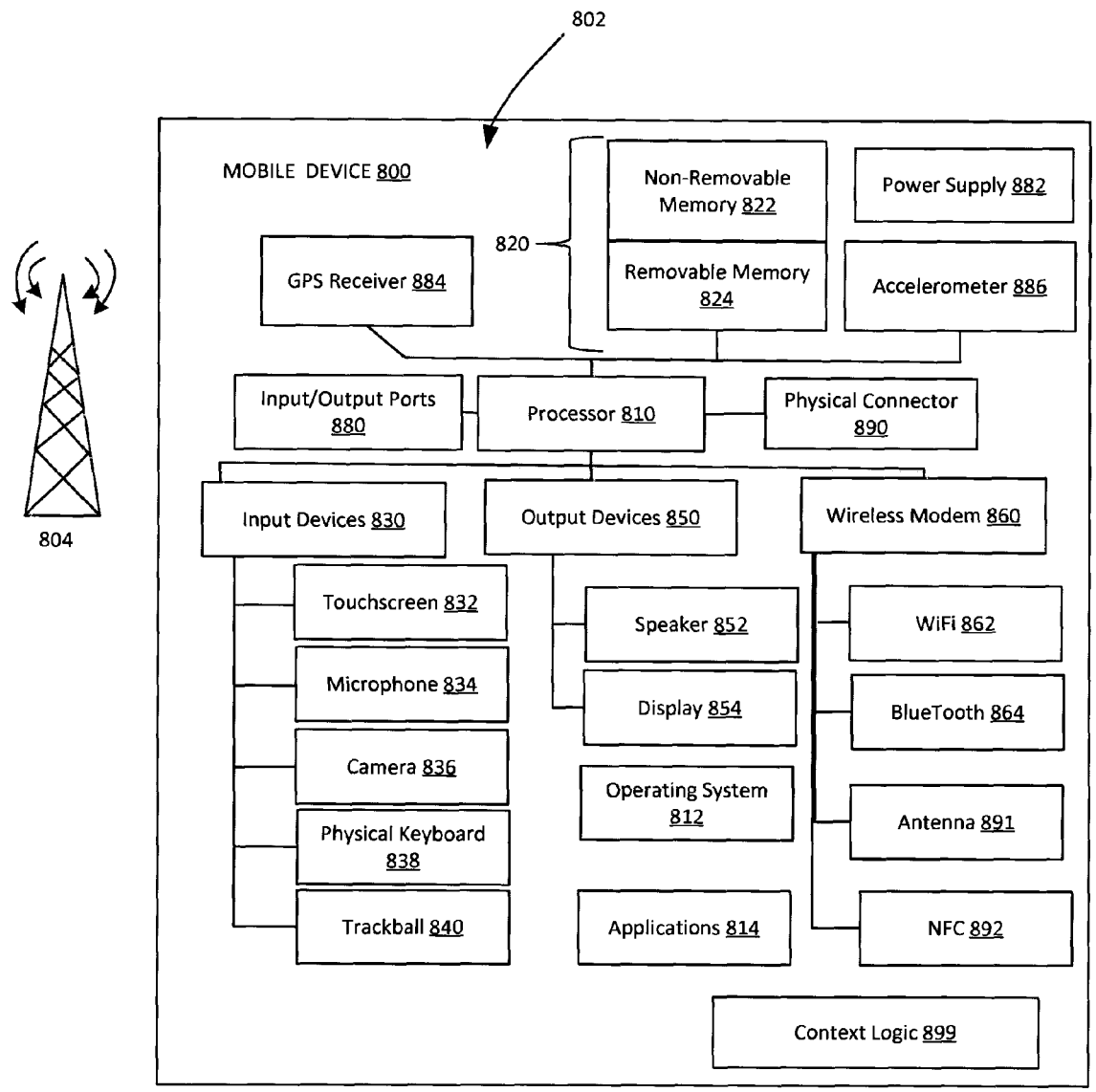
FIG. 8 is a system diagram depicting an exemplary mobile communication device configured to facilitate launch surface control.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, etc.) and may allow wireless two-way communications with one or more mobile communications networks 804, such as a cellular or satellite networks.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include gaming applications, mobile computing applications (e.g., email applications, calendars, contact managers, web browsers, messaging applications), or other computing applications. In different embodiments, mobile device 800 may function as a game console or game controller.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include web pages, text, images, sound files, video data, or other data sets to be sent to or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). The identifiers can be transmitted to a network server to identify users or equipment. The memory 820 may store user context information, launch surface ownership information, user context identifying information, launch surface ownership identifying information, or other data.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to a gaming application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). Near field communication (NFC) element 892 facilitates having near field communications.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a context logic 899 that is configured to provide a functionality for the mobile device 800. For example, context logic 899 may provide a client for interacting with a service (e.g., service 760, FIG. 7). Portions of the example methods described herein may be performed by context logic 899. Similarly, context logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   displaying a first user interface element on a shareable launch surface associated with a multi-user system;
   controlling the first user interface element to present first information concerning a current owner of the launch surface and a potential owner of the launch surface, where ownership of the launch surface controls the context with which an action taken through the launch surface will be associated, where an active user of the multi-user system has an active context, where a context comprises an attribute and a state, the attribute being an account identifier and a data plan identifier, and at least one of: a screen name, a billing identifier, a parental control setting, a display preference, or a social media data, and the state being a data plan balance and a connectivity level, and at least one of a billing balance, an account balance, an experience level, an access time, or an engaged time; and
   upon detecting a first selection associated with the first information presented by the first user interface element, selectively changing ownership of the launch surface as a function of the first selection, where the ownership of the launch surface is changed while maintaining a first user experience associated with the multi-user system, where maintaining the first user experience associated with the multi-user system comprises changing the context of an application running on the multi-user system without navigating to the launch surface and changing the context of the running application without exiting the running application.

2. The method of claim 1, comprising:
   identifying a user of an apparatus operably connected to and communicating with the multi-user system, the apparatus being configured with a launch surface user interface element; and
   upon detecting an interaction with the launch surface user interface element, selectively changing ownership of the launch surface to the user of the apparatus without navigating to the launch surface.

3. The method of claim 2, comprising:
   displaying a second user interface element associated with a second running application launched from the launch surface:
   controlling the second user interface element to present second information concerning a current user whose context is associated with the second running application and a potential user whose context can be associated with the second running application; and
   upon detecting a second selection associated with the second information presented by the second user interface, selectively changing, while maintaining a second user experience associated with the multi-user system, the context of the second running application as a function of the second selection.

4. The method of claim 3, comprising configuring the first user interface element to be visible from the launch surface and from the running application and to present the first information using images, icons, avatars, names, or text.

5. The method of claim 4, where selectively changing ownership of the launch surface comprises:
   identifying a new owner of the launch surface as a function of the first selection;
   selecting and accessing a context associated with the new owner, and
   associating the context associated with the new owner with the shared launch surface.

6. The method of claim 4, comprising configuring the second user interface element to be visible from the launch surface and from the second running application, and to present the second information using images, icons, avatars, names, or text.

7. The method of claim 3, where maintaining the second user experience comprises changing the context of the second running application without navigating to the launch surface, changing the context of the second running application without exiting the running application, and changing the context of the second running application without changing ownership of the launch surface.

8. The method of claim 3, comprising selectively displaying or hiding the first user interface element or the second user interface element in response to a user action detected by the multi-user system, the user action being a voice command, a gesture, or an interaction with a graphical user interface.

9. The method of claim 2, the launch surface user interface element being a button on a game controller, the interaction being a press of the button.

10. The method of claim 1, the multi-user system being associated with a video game console.

11. The method of claim 1, the shareable launch surface being associated with a multi-user operating system running on a laptop computer, a tablet computer, or a phone.

12. The method of claim 1, the launch surface action being launching an application.

13. A computer-readable storage medium storing computer-executable instructions that when executed by a computer control the computer to perform a method, the method comprising:
   presenting a first user interface element using a shareable launch surface associated with a multi-user system, where an active user of the multi-user system has an active user context, where the multi-user system includes a processor, and where a context comprises an attribute and a state, the attribute being an account identifier and a data plan identifier, and at least one of a billing identifier, a parental control setting, a display preference, or a social media data, and the state being a data plan balance and a connectivity level, and at least one of a billing balance, an account balance, an experience level, an access time, or an engaged time;

configuring the first user interface element to be presented from the launch surface, from a running application, or from an apparatus operably connected to the multi-user system;

controlling the first user interface element to present first information concerning a current owner of the launch surface and a potential owner of the launch surface, the first information being presented using images, icons, avatars, names, speech, haptics, sound, or text, where ownership of the launch surface controls the context with which a launch surface action will be associated, the launch surface action being launching an application;

upon detecting a first selection associated with the first information presented by the first user interface element, selectively changing ownership of the launch surface as a function of the first selection while maintaining a first user experience associated with the multi-user system, where maintaining the first user experience associated with the multi-user system comprises changing the context of an application running on the multi-user system without navigating to the launch surface and changing the context of the running application without exiting the running application;

identifying a user of an apparatus operably connected to and communicating with the multi-user system, the apparatus being configured with a launch surface user interface element;

upon detecting an interaction with the launch surface user interface element, selectively changing ownership of the launch surface to the user of the apparatus without navigating to the launch surface;

presenting a second user interface element associated with a second running application launched from the launch surface;

configuring the second user interface element to be presented from the launch surface and from the second running application;

controlling the second user interface element to present second information concerning a current user whose context is associated with the second running application and a potential user whose context can be associated with the second running application, the second information being presented using images, icons, avatars, names, speech, haptics, sounds, or text;

upon detecting a second selection from the second user interface, selectively changing the context of the second running application as a function of the second selection while maintaining a second user experience associated with the multi-user system; and selectively presenting or hiding the first user interface element or the second user interface element in response to a voice command or a gesture.

\* \* \* \* \*